United States Patent [19]

Tokura

[11] Patent Number: 5,432,994
[45] Date of Patent: Jul. 18, 1995

[54] TUBE EXPANDER WITH A MEANS FOR TRANSPORTING HEAT EXCHANGERS IN TUBE EXPANDING PROCESS

[75] Inventor: Kenji Tokura, Osaka, Japan

[73] Assignee: Kyoshin Kogyo Co. Ltd., Osaka, Japan

[21] Appl. No.: 203,571

[22] Filed: Mar. 1, 1994

[30] Foreign Application Priority Data

Mar. 2, 1993 [JP] Japan .................. 5-041500
Mar. 5, 1993 [JP] Japan .................. 5-045526

[51] Int. Cl.6 ............................................ B23P 15/26
[52] U.S. Cl. ...................................... 29/727; 29/726.5; 29/799
[58] Field of Search ............... 29/726.5, 727, 799; 414/222

[56] References Cited

U.S. PATENT DOCUMENTS

| | | | |
|---|---|---|---|
| 4,371,106 | 2/1983 | Chapman | 29/726 |
| 4,382,329 | 5/1983 | Takaoka et al. | 29/726 |
| 4,631,813 | 12/1986 | Daniels et al. | 29/727 |
| 4,718,810 | 1/1988 | Hoehn et al. | 414/222 |
| 4,805,299 | 2/1989 | Sekimoto et al. | 29/799 |
| 4,824,310 | 4/1989 | Kosmowski et al. | 414/222 |
| 4,829,648 | 5/1989 | Arzenti et al. | 29/726 |
| 5,040,405 | 8/1991 | Honma et al. | 29/727 |
| 5,220,722 | 6/1993 | Milliman | 29/726 |

FOREIGN PATENT DOCUMENTS 0161249 7/1991 Japan .

Primary Examiner—Irene Cuda
Assistant Examiner—Marc W. Butler
Attorney, Agent, or Firm—Nikaido Marmelstein Murray & Oram

[57] ABSTRACT

A tube expander having a tube expander body, a reciprocable member to be reciprocated with its surface facing a tube to be expanded which is mounted in a heat exchanger unit, and a mandrel mounted on the reciprocable member so as to be inserted into the tube for the expansion thereof. A support fixture, on which the heat exchanger unit is separably mounted, is movably mounted on a mounting table which is disposed towards the moving direction of the mandrel such that the support fixture is transported on the mounting table in the transverse direction relating to the moving direction of the reciprocable member. A holding mechanism is provided on at least one of the mounting table and a peripheral area thereof so as to hold the support fixture or the heat exchanger unit mounted thereon, introduce the heat exchanger unit with the tube to be expanded into a tube expanding area, and discharge the heat exchanger unit from the tube expanding area after expanding the tube thereof.

8 Claims, 7 Drawing Sheets

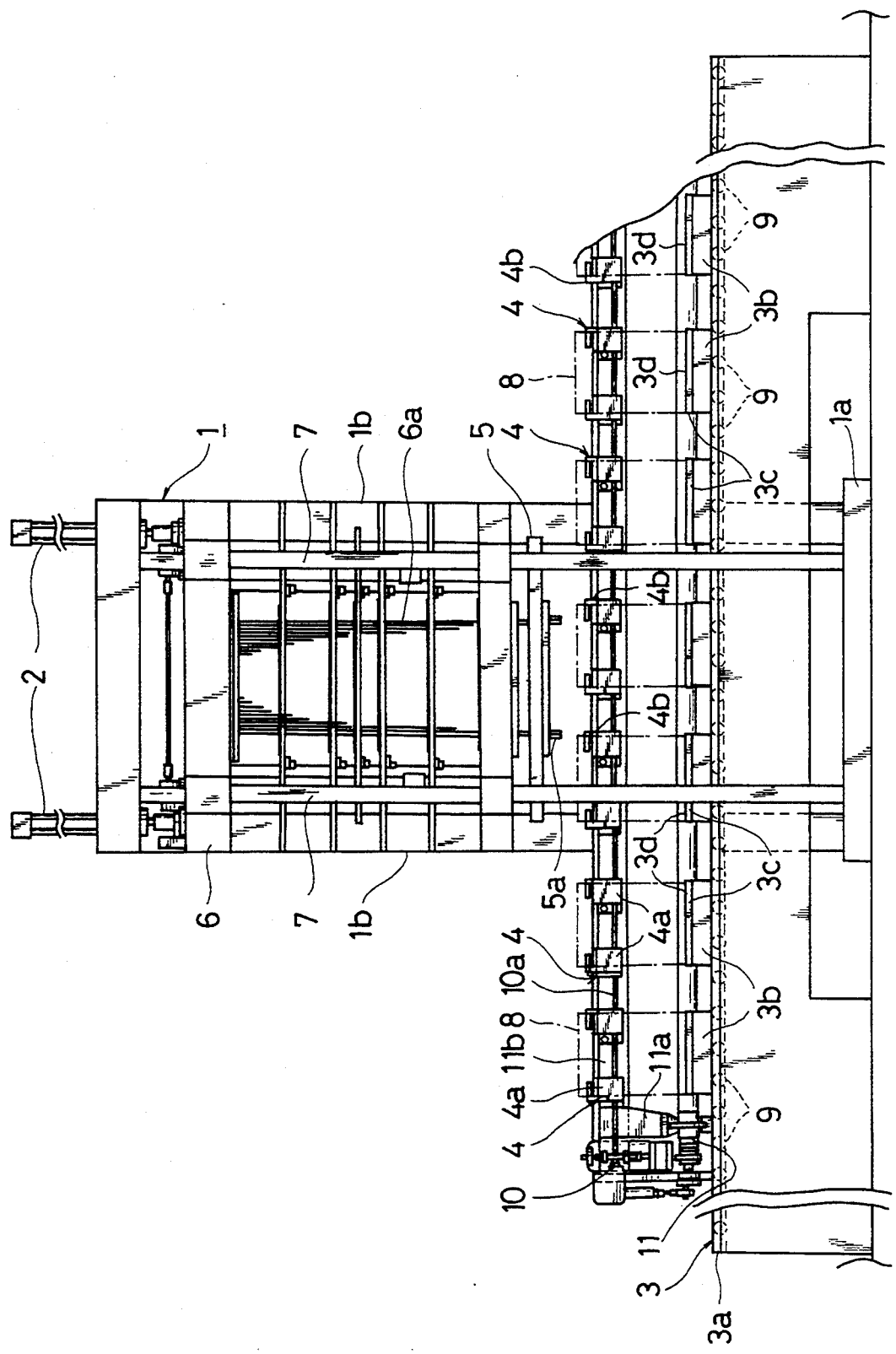

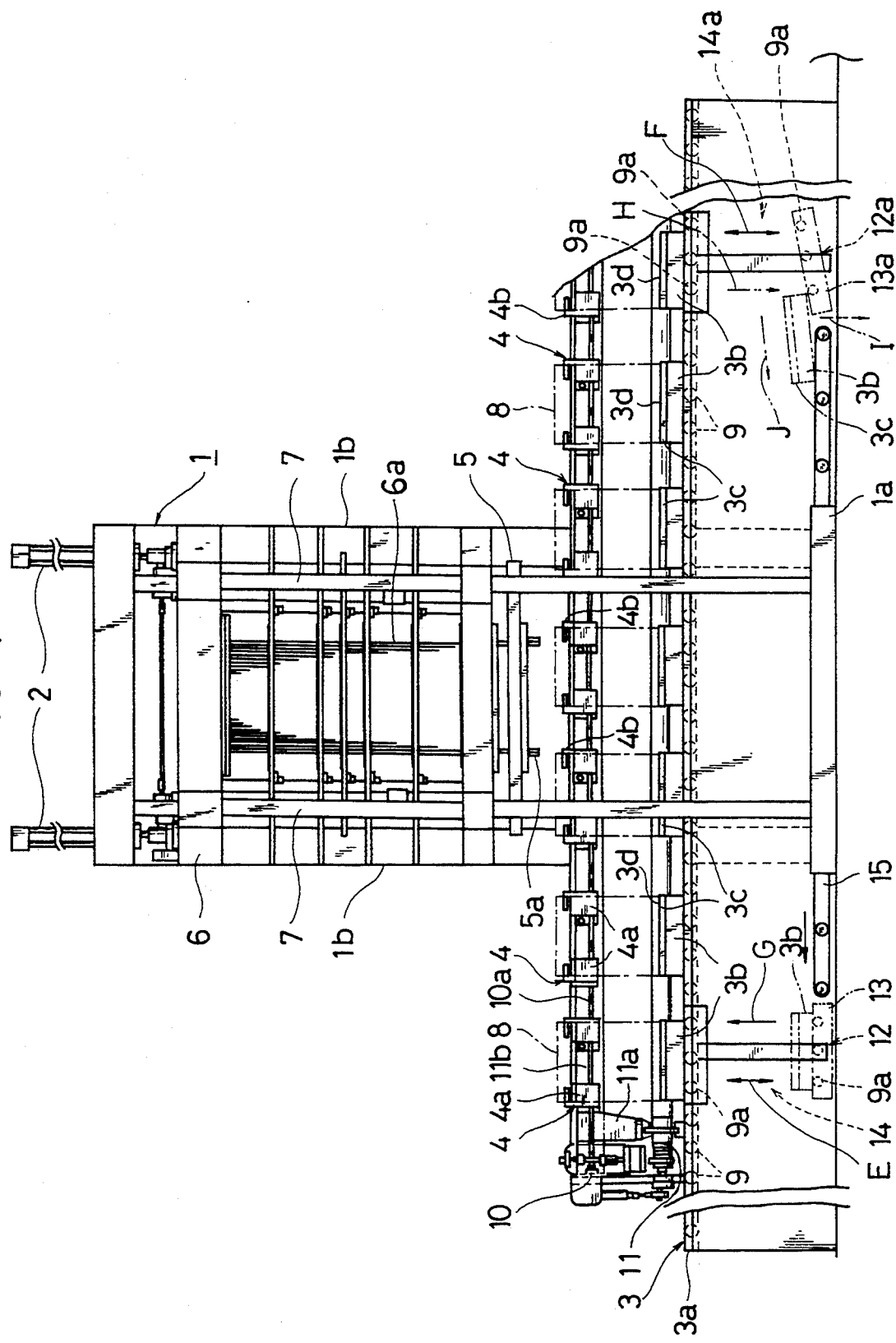

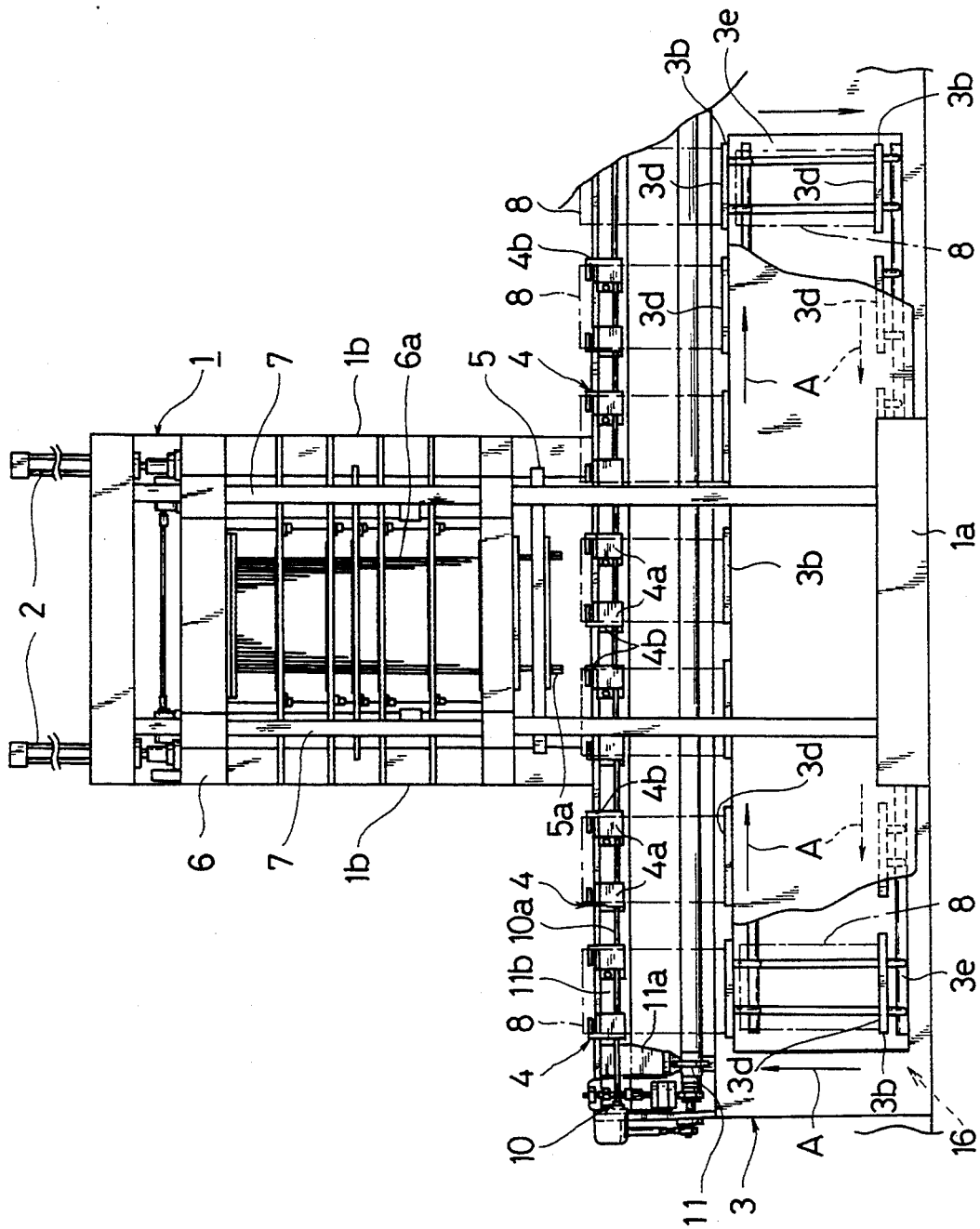

TUBE EXPANDER WITH A MEANS FOR TRANSPORTING HEAT EXCHANGERS IN TUBE EXPANDING PROCESS

BACKGROUND OF THE INVENTION

This invention relates to a tube expander with a means for transferring heat exchanger units and more particularly to a tube expander with a means for automatically and successively transporting partially assembled-heat exchange units having tubes therein into a tube expanding area, securing them in position, and bringing them out of the expanding area to the next subsequent process after expanding the tubes, which can eliminate troublesome works such as manually supplying and removing of the heat exchangers in tube expanding process.

A conventional apparatus with a means for transporting the heat exchanger units into the tube expanding area in tube expanding process is illustrated in FIGS. 6 and 7. A tube expander 26 includes a reciprocable slide member 18 which can be moved vertically via a cylinder 17, and a plurality of mandrels 19 which are suspended from the reciprocable slide member 18. A mounting table 23 is mounted on a base 24 so as to be pivotally driven by a hydraulic cylinder 2S via a pivotally moving mechanism of predetermined construction. A plurality of heat exchanger units having radiation fins 20 and tubes 21 inserted thereinto mounted on the mounting table 23 are introduced into a space to which the reciprocating member is moved. The apparatus of this arrangement reciprocating member is moved. The apparatus of this arrangement is generally used in tube expanding process.

In the above arrangement, when the heat exchanger unit 22 is to be supplied into the tube expander 26, the heat exchanger unit 22 is transported by a cart or the like to an area where the tube expanding process is carried out, and a worker manually transfers it onto the mounting table 23 and sets it in position one by one.

However, the above arrangement is disadvantageous in the fact that the heat exchanger unit 22 has to be manually set on and removed from the mounting table 23 after every expanding of the tubes 21 of the heat exchanger unit 22. In addition, the heat exchanger unit 22 with the expanded tubes 21 has to be transported to the next process by a transporting means.

To solve the above problem, there has been proposed an apparatus (not shown) which includes a conveyor for conveying the heat exchanger units 22 which extends to the mounting table 23 of the tube expander 26. With this arrangement, troublesome work for setting the heat exchanger unit 22 could be reduced. However, since elements of the partially assembled heat exchanger unit 22 such as unexpanded tubes 21 and the radiation fins 20 are not securely connected to each other, the tubes 21 may drop out of the radiation fins 20, and undesirous distortion or the like may occur in an overall shape thereof during the movement. Accordingly, it is difficult to simply convey the partially assembled heat exchanger unit 22 by means of the conveyor or the like. consuming due to the time necessary to set the heat exchanger unit 22 on the mounting table 23, and transfer the heat exchanger unit 22 therefrom to the transporting means for transporting the same to the next process, which may lower the effectiveness of the overall manufacturing process of the heat exchanger unit 22.

Further, since various types of the heat exchanger unit 22 which includes the radiation fins 20, and tubes 21 inserted therethrough having different outer diameters, patterns or the like, have to be expanded as usual, different tube-receiving members 27 corresponding in number, outer diameter, pattern or the like to the tubes mounted in the heat exchanger unit 22 have to be prepared and set in position, which may require a troublesome work.

SUMMARY OF THE INVENTION

It is an object of the present invention to provide an apparatus for transporting heat exchanger units through tube expanding process, which shortens the time necessary to set the heat exchanger unit with tubes to be expanded and to remove the heat exchanger unit 22 with expanded tubes therefrom to a transporting means for transporting the same to the next process.

It is another object of the present invention to provide an apparatus for transporting the heat exchanger units in a tube expanding process, which eliminates the troublesome work for changing a tube-receiving plate so as to correspond to the tubes of different outer diameter, pattern or the like, and effectively assembles the heat exchanger unit.

Accordingly, there is provided a tube expander having a tube expander body, a reciprocable member adapted for being reciprocated with its surface facing a tube to be expanded which is mounted in a heat exchanger unit, and a mandrel mounted on the reciprocable member so as to be inserted into the tube. A support fixture, on which the heat exchanger unit is separably mounted, is movably mounted on a mounting table which is disposed towards the moving direction of the mandrel such that the support fixture is transported on the mounting table in the transverse direction relating to the moving direction of the reciprocable member. A holding mechanism is provided on at least one of the mounting tables and a peripheral area thereof so as to hold at least one of the support fixtures and the heat exchanger unit mounted on the support fixture, introduce the heat exchanger unit with the tube to be expanded into a tube expanding area, and discharge the heat exchanger unit from the tube expanding area after expanding the tube thereof.

Further, the tube expander of the present invention is characterized in that the holding mechanism is disposed annularly so as to successively transport the heat exchanger unit in a predetermined direction along the longitudinal direction of the mounting table, while holding at least one of the support fixtures and the heat exchanger unit mounted on the support fixture.

Further, the tube expander of the present invention is characterized in that the holding mechanism is disposed such that it can simultaneously hold a predetermined number of the heat exchanger units by at least one of the support fixtures and the heat exchange unit mounted thereon, move forward so as to transport the heat exchanger units by a predetermined distance, release them and move backward so as to hold the newly allocated heat exchanger units.

Further, the tube expander of the present invention is characterized in that at least one of a mounting mechanism adapted for mounting the support fixture on the mounting table and a discharging mechanism adapted for discharging the support fixture from the mounting table is disposed on the mounting table or the peripheral area thereof.

Further, the tube expander of the present invention is characterized in that a plurality of the support fixtures are successively and annularly transported such that a surface of each of the support fixtures adapted for mounting the heat exchanger unit can ordinally face the reciprocable member.

Still further, the tube expander of the present invention is characterized in that an endless transporting mechanism is provided on the mounting table so as to successively and endlessly transport a plurality of the support fixtures in a predetermined direction.

Further, the tube expander of the present invention is characterized in that the support fixture is provided thereon with a tube-receiving member which is made of a resilient material.

In the above arrangement, since the partially assembled heat exchanger unit is transported to the tube expanding area, securely holding at least one of the support fixture and the heat exchanger unit, the dropping of the unexpanded tubes from the radiation fins, and the undesirous distortion or the like of the heat exchanger unit in an overall shape due to its unsecurely assembled construction, can be effectively avoided.

Further, in the above arrangement, since at least one of the mounting mechanism adapted for mounting the support fixture on the mounting table and the discharging mechanism adapted for discharging the support fixture from the mounting table is disposed on the mounting table or the peripheral area thereof, it is possible to shorten the time necessary to set the partially assembled heat exchanger unit with tubes to be expanded on the mounting table, and remove the heat exchanger unit 22 with the expanded tubs therefrom to the transporting means for transporting the same to the next subsequent process.

Further, since a plurality of the support fixtures are successively and annularly transported such that the surface of each of the support fixtures adapted for mounting the heat exchanger unit can ordinally face the reciprocable member, the heat exchanger units can be mounted and dismounted at the same place, and the overall length of the mounting table can be substantially shortened.

Further, since the endless transporting mechanism is provided on the mounting table so as to successively and annularly transport a plurality of the support fixtures in a predetermined direction, the heat exchanger unit can be transported more smoothly in cooperation with the holding mechanism.

Further, since the support fixture is provided thereon with the tube-receiving member made of the resilient material, it is possible to eliminate the troublesome work for changing the tube-receiving member when the tubes have different outer diameters, patterns or the like, and instantly and securely mount the heat exchanger unit on the support fixture.

BRIEF DESCRIPTION OF THE DRAWINGS

The above, and other objects, features and advantages of the present invention will become apparent from the detailed description read in conjunction with the accompanying drawings, which are given by way of illustration only, and thus are not limitative of the present invention, and wherein:

FIG. 1 is a front view illustrating one embodiment of a tube expander of the present invention;

FIG. 4 is a front view illustrating another embodiment of the tube expander of the present invention;

FIG. 5 is a front view illustrating still another embodiment of the present invention;

DETAILED DESCRIPTION OF THE PREFERRED EMBODIMENTS

Figure 2A:
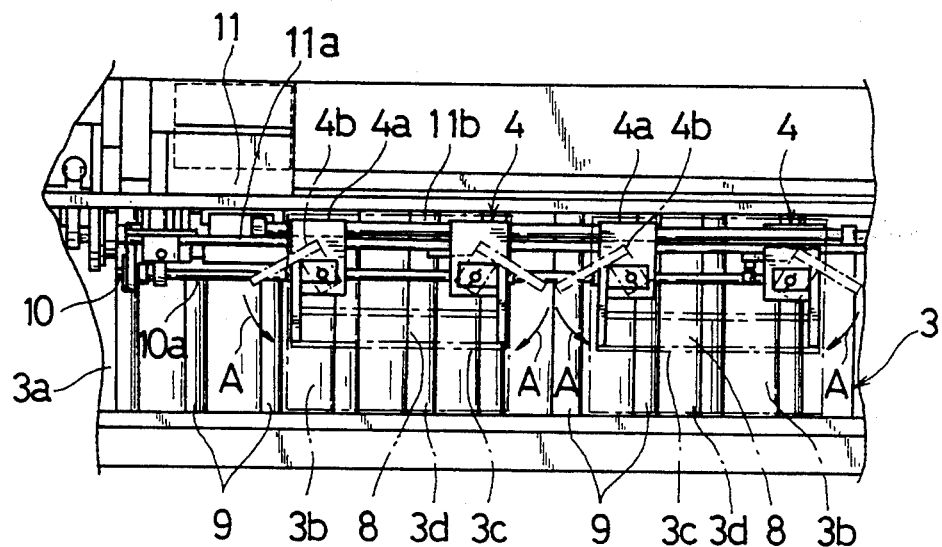
FIG. 2A is a partially enlarged plan view illustrating a state of a heat exchanger unit under transportation.

Embodiments of the present invention will be described in the accompanying drawings attached hereto.

Referring to FIG. 1, a tube expander includes a tube expander body 1 which in turn, includes a pair of columns 1b which is fixed to a base 1a and extend upwardly. A reciprocable slide plate 6 from which a plurality of mandrels 6a are suspended are moved vertically along a pair of guide posts 7 via a pair of cylinders 2 which are disposed above the tube expander body 1. Below the reciprocable slide plate 6 are disposed a flaring punch plate 5 on which flaring punches 5a are fixed so as to flare open ends of corresponding tubes which have been previously expanded.

A mounting table 3 is disposed in a lower portion of the tube expander body 1. A mounting region 3a is formed on the mounting table 3 so as to accommodate the heat exchanger unit 8. On the mounting table 3 are disposed a plurality of support fixtures 3b, each of which has a tube-receiving member 3c thereon which is of a flat shape and made of rubber. The heat exchanger unit 8 can be stably mounted on the support fixture 3b via the tube-receiving member 3, since the tube-receiving member 3c is deformed in shape to conform around a partial length of the tube protruding outwardly away from the heat exchanger unit 8 due to its resiliency. The mounting table 3 is formed such that a plurality of the support fixtures 3b can be mounted in a line which extends in the transverse direction relating to the moving direction of the reciprocable slide plate 6.

A plurality of rollers 9 are disposed on the mounting region 3a, having axes arranged in the transverse direction of the longitudinal direction of the mounting table, and parallel to each other so as to freely transport the heat exchanger unit 8 in the longitudinal direction of the mounting table 3, that is, in the transverse direction of the moving direction of the reciprocable slide plate 6.

A plurality of holding mechanisms 4 are disposed at predetermined spacing as the heat exchanger units 8 on a guide rail 11b which extends along the longitudinal direction of the mounting table 3 so as to simultaneously hold the heat exchanger units 8 which have been mounted on the mounting table 3 in a line, and in a number, spacing corresponding to the holding mechanisms 4.

Each of the holding mechanisms 4 includes a pair of clamping mechanisms 4a, each of which has a clamping member 4b which is pivotally movable so as to clamp the heat exchanger unit 8 by its opposite sides in cooperation with the corresponding clamping member 4b. The holding mechanisms 4 are connected to a rotating mechanism 10 which includes a pulse motor 10b and a transmission gear member 10c. The clamping members 4b are arranged at predetermined spacing on a movable plate 10a extending along the guide rail 11b so as to simultaneously clamp a plurality of the heat exchanger units 8 mounted on the mounting table 3. The movable plate 10a is integrally connected to a horizontally reciprocating member 11a which is, in turn, movably connected to a rodless cylinder 11. A rotatable rod 10a on which external threads (not shown) of predetermined pitch are formed is inserted into each of the clamping mechanisms 4a. The external threads are engaged with a gear member (not shown) of each of the clamping mechanisms for transmitting of the motion of the rotatable rod 10a into the clamping mechanism. One end of the rotatable rod 10a is connected to the transmission gear member 10 so as to rotate the rotatable rod 10a in both directions and consequently render the clamping members move towards and away from each other.

The operation of the tube expander in accordance with the above arrangement is discussed hereinafter. Referring to FIGS. 1 and 2A, the heat exchanger units 8, each of which includes the tubes to be expanded by press-fitting the mandrels 6a extending downwardly from the reciprocable slide plate 6 onto the open ends of the tubes, are mounted on the support fixture 3b via the tube-receiving member 3c. The support fixtures 3b with the heat exchanger units 8 thereon are disposed on the rollers 9 of the mounting region 3a of the mounting table 3 at a predetermined spacing.

A pair of the clamping members 4b move towards each other in the direction of arrow A and clamp the heat exchanger units 8 by its opposite sides for the secure holding thereof, as illustrated in FIG. 2A.

Figure 2B:
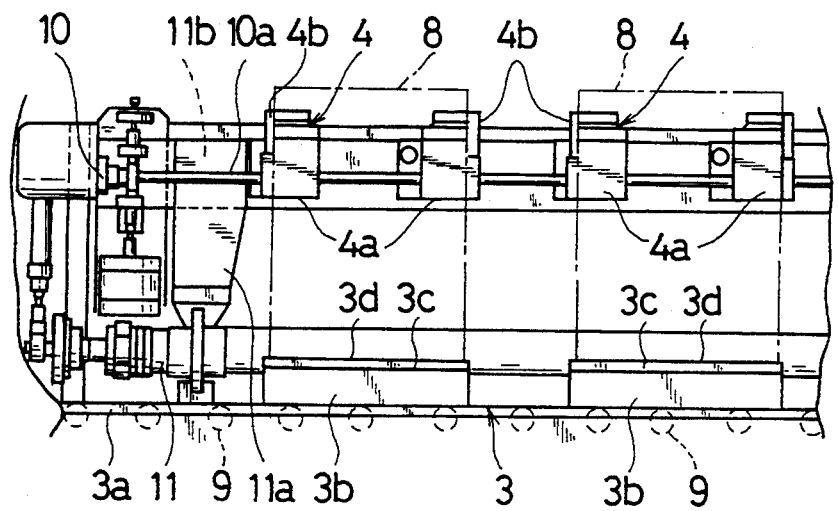
FIGS. 2B and 2C are partially enlarged front views respectively illustrating subsequent states of the heat exchanger unit under transportation.
Figure 2C:
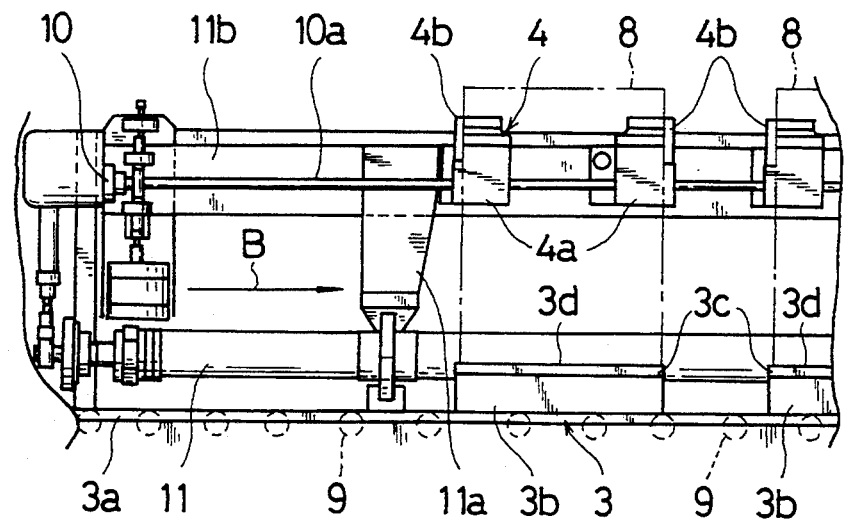

After the heat exchanger units 8 have been securely held by the clamping members 4b as illustrated in FIG. 2B, the holding mechanisms 4a move in the direction of arrow B via the horizontally reciprocating member 11a which moves in the longitudinal direction of the mounting table 3 along a guide rail 11b by a predetermined distance, as illustrated in FIG. 2C. Accordingly, the heat exchanger units 8 are transported along the rollers 9 together with the holding mechanisms 4a by a predetermined distance.

Figure 3A:
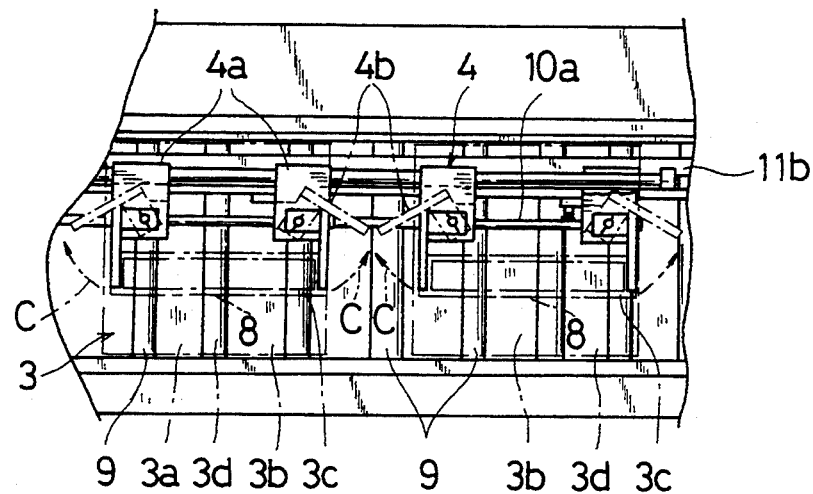
FIG. 3A is a partially enlarged plan view illustrating another state of the heat exchanger unit under transportation.
Figure 3B:
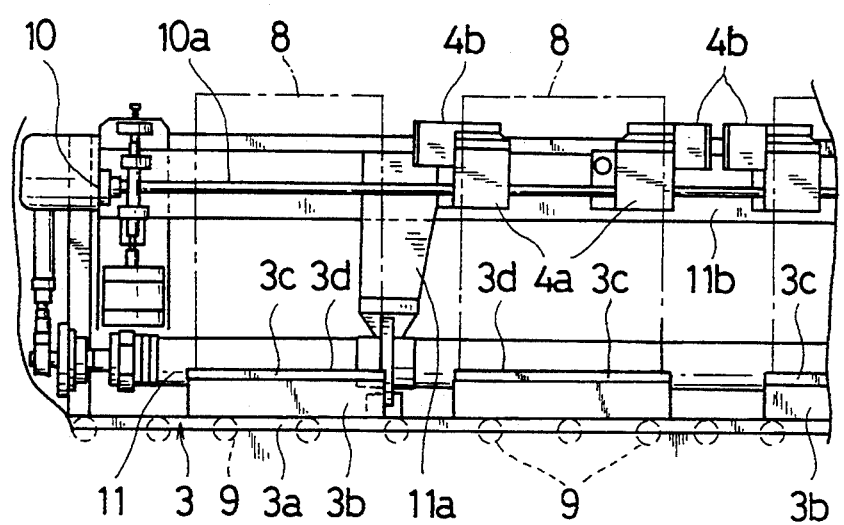
FIGS. 3B and 3C are partially enlarged front views respectively illustrating subsequent states of the heat exchanger unit under transportation.

Then, the heat exchanger units 8 are temporarily released from the clamping mechanisms 4 by moving the clamping members 4b away from each other in the direction of arrow C, as illustrated in FIGS. 3A and 3B.

Figure 3C:
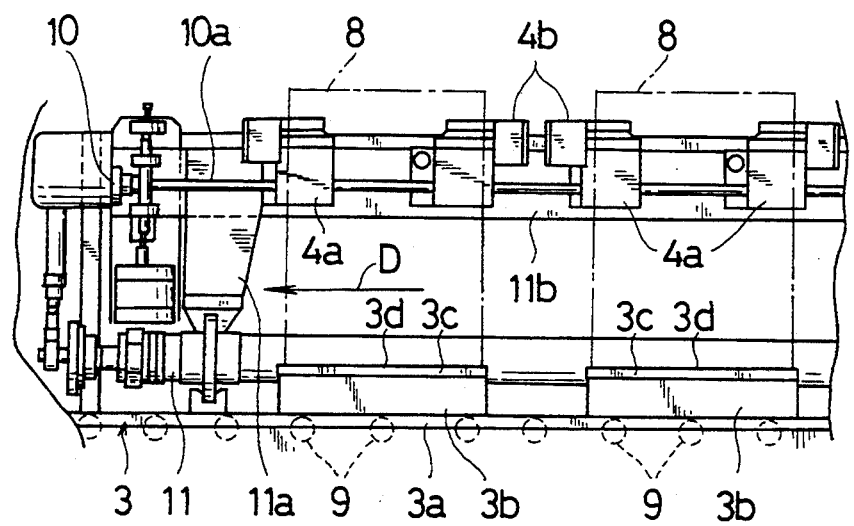
Figure 6:
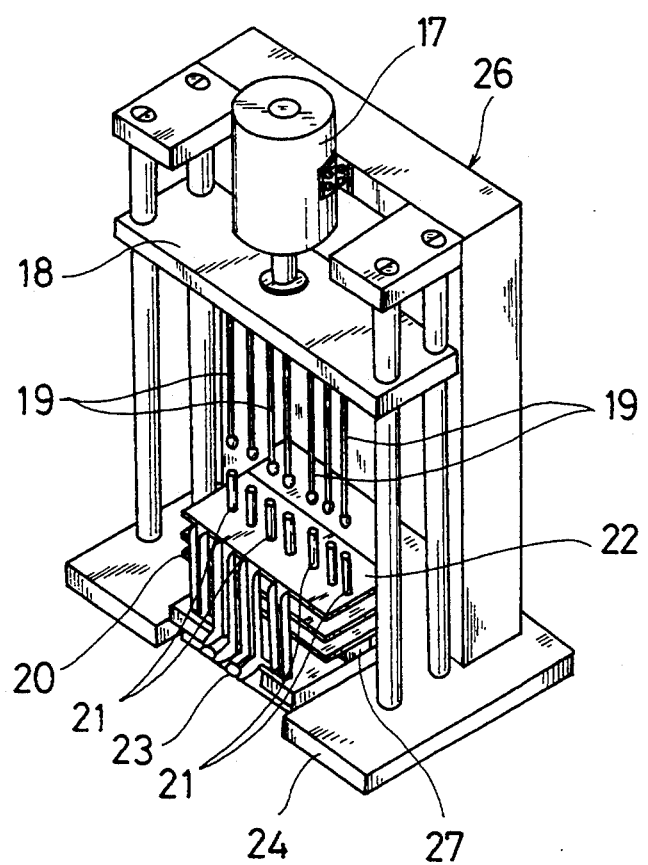
FIG. 6 is a perspective view illustrating a conventional tube expander.
Figure 7:
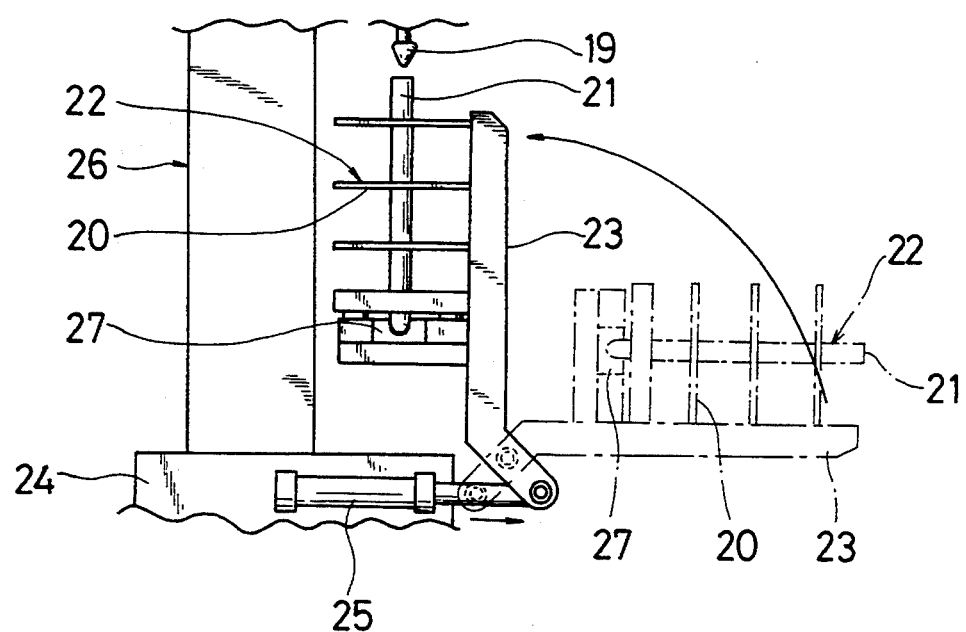
FIG. 7 is a side view of the tube expander of FIG. 6 illustrating a state in which the heat exchanger unit is introduced into a tube expanding area of the tube expander.

Referring to FIG. 3C, while temporarily releasing the heat exchanger units 8, the holding mechanisms 4 and the horizontally reciprocating member 11a respectively move back to the initial positions in the direction of arrow D so as to further hold the heat exchanger units 8, each of which has been moved forward.

In this embodiment, the reciprocable slide plate 6 is moved vertically along a pair of guide posts 7 via a pair of cylinders 2 disposed above the tube expander body 1. However, the specific number of cylinders 2 and guide posts 7 are not to be limited. For example, a single cylinder 2 and guide post 7 can be employed. Further, four guide posts 7 can be respectively arranged on corners of the reciprocable slide plate 6.

A so-called LM guide can be disposed along the column 1b which is vertically disposed on the base 1a, along which the reciprocable slide plate 6 moves vertically.

Further, it is not limited to employ the rollers 9 as a means for allowing the heat exchanger unit 8 to be supplied into and discharged from the mounting table successively. Instead, the mounting table may be formed, for example, by suspending an endless belt (not shown) between rotating members such as rollers which are disposed at places corresponding to the opposite ends of the mounting table 3. Or a plurality of bearings (not shown) can be arranged on the mounting table 3 at predetermined spacing.

Further, a cart-like mounting plate (not shown) having rotatable members (not shown) may be disposed on the mounting table 3. In this case, the rotatable members are rotated along rail members (not shown) which extends along the longitudinal direction of the mounting table 3 such that the heat exchanger unit 8 on the mounting plate 3 can be moved along the rail members.

Although the clamping member 4b is operable via the rotation of the rotatable rod 10a, it may be operated, for example, by a cylinder and an electric motor. It is essential that the holding mechanisms 4 can simultaneously hold the heat exchanger units on the mounting table 3 directly or indirectly. The clamping members 4b may be formed so as to clamp the heat exchanger unit 8 by any sides thereof. It is a matter of course that a variety of shape, number, and a fixing method of the clamping member 4b may be employed.

In this embodiment, the holding mechanism 4 is operated by the rodless cylinder 11 from outside via the horizontally reciprocating member 11a, and other elements associated therewith. However, the holding mechanism 4 can be independently moved by mounting a cylinder, electric motor or other power source in each of the holding mechanism 4, per se. It is essential that the holding mechanism 4 may be moved forward in a predetermined direction by a predetermined distance and moved backward to the initial position. Further, a variety of reciprocating mechanisms can be employed for the holding mechanism 4.

Although the heat exchanger units 8 are mounted on the mounting regions 3d of the support fixture 3b in a line, they may be mounted thereon in two or more than two lines. It is essential that the heat exchanger units 8 are mounted at intervals on the mounting table 3 in at least one line, are simultaneously clamped with clamping means of various constructions and are transported by a predetermined distance. Further, a variety of mechanism, shapes, mounting places, numbers or the like can be employed for the mounting table 3 and the holding mechanism 4.

In this embodiment, the mounting table 3 is formed such that the heat exchanger units 8 can be transported in the transverse direction relating to the moving direction of the reciprocable slide member 6. However, it is not necessary to form the mounting table 3 as a single unit. Instead, a plurality of the mounting tables 3 can be separately disposed in the tube expander.

For example, a pair of mounting tables 3 can be respectively disposed from the tube expanding area of the tube expander body 1 towards the opposite sides. Further, it is not necessary to form the mounting table 3 such that the heat exchanger units 8 can be transported in one direction. For example, the heat exchanger units 8 can be transported in various directions such as frontwards and sidewards by arranging the mounting tables 3 so as to extend frontwards and sidewards from the tube expanding area. As can be seen, the mounting tables 3 of such a L-shape can be integrally made.

Further, the holding mechanism 4 may be disposed on both the mounting table 3 and a peripheral region thereof, or on either region, provided that the heat exchanger units 8, which are mounted on the support fixtures 3b adapted for moving in the transverse direction relating to the moving direction of the reciprocable slide plate 6, can be brought into the tube expanding area of the tube expander body 1 and discharged away therefrom by holding the heat exchanger units 8 with the holding mechanism 4 and by moving the same by a predetermined distance. In this regard, it is not necessary to dispose a plurality of the holding mechanisms 4 in series. Instead, the single holding mechanism 4 may carry out the above essential process.

As can readily be appreciated, the tube-receiving member 3c may be made of various materials such as natural rubber, butadiene rubber, and polyurethane, polyvinyl chloride, elastomer and other synthetic resin material, provided that it can instantly and securely receive the heat exchanger unit 8 with the tubes protruding away therefrom which have different diameters, patterns or the like according to the heat exchanger unit 8 of various types using flexibility of materials, make the heat exchanger unit 8 seat stably on the support fixture therethrough, securely receive the tubes oppressed by the mandrels 6a in the tube expanding process, and consequently omit the troublesome work for changing the tube-receiving member 3c. For attaining these effects, fibrous materials may be used by integrally forming them. Further, the tube-receiving member 3c may be formed into various shapes, and a plurality of tube-receiving members 3c may be mounted on the single support fixture 3. And, it is not essential of the present invention to provide the tube-receiving member 3c, if other members or elements can attain the above effects.

Although the tube expander body 1 is formed such that the reciprocable slide plate 6 can be moved vertically so as to expand the tubes via the mandrels 6a, the tube expander body 1 may be formed such that the reciprocable slide plate 6 can be moved horizontally. Further, it is not necessary to limit the mechanism of the flaring punch plate 5 and flare punch 5a. It is a matter of course that the flaring punch plate 5 and flare punch 5a may be omitted from the tube expander body 1 of the present invention.

Referring to FIG. 4, a supplying mechanism 12 is provided on one end of the mounting table 3 so as to supply the support fixture 3b onto the mounting table 3, which includes a first holding table 13 for holding the support fixture 3b thereon, and a first lifter 14 for moving the first holding table 13 vertically in the direction of arrow E. Rollers 9a are mounted on the first holding table 13 so as to become flush with the rollers 9 of the mounting table 3 when the first lifter has lifted the first holding table 13. Rollers 9a are rotatable in the same direction as the rollers 9.

On the opposite end of the mounting table 3 is provided a discharging mechanism 12a so as to discharge the support fixture 3b from the mounting table 3, which includes a second holding table 13a for holding the support fixture 3b thereon, a second lifter 14a for moving the second holding table 13a vertically in the direction of arrow F, and rollers 9a mounted on the second holding table 13a so as to become flush with the rollers 9 when the second lifter 14a lifted the second holding table 13a. Rollers 9a are rotatable in the same direction as the rollers 9. The second holding table 13a is inclined about a predetermined angle in the direction of arrow I such that the support fixture 3b thereon can slide towards the supplying mechanism 12 in the direction of arrow J, when the second holding table 13a has come down from the mounting table 3 in the direction of arrow H. Between the supplying mechanism 12 and the discharging mechanism 12a is provided a return conveyor 15 to transport the support fixture 3b which slides from the second holding table 13a, back towards the first holding table 13 of the supplying mechanism 12.

In operation, the heat exchanger unit 8 is mounted on the first holding table 13 via the support fixture 3b and the tube-receiving member 3c. The fist lifter 14 then lifts the heat exchanger unit 8 towards the mounting table 3 in the direction of arrow G and keep it at a height where the rollers 9a of the first holding table 13 are flush with the rollers 9 of the mounting table 3, whereby the support fixture 3b with the heat exchanger unit 8 thereon can smoothly slide from the fist holding table 13 to the mounting table along rollers 9a and the rollers 9. The heat exchanger unit 8 is brought towards the opposite end of the mounting table 3 through the tube expanding area by means of the holding mechanism 4. Then, the support fixture 3b with the expanded heat exchanger unit 8 thereon, is transferred onto the second holding table 13a which is in a standby position where the rollers 9a are flush with the rollers 9. The support fixture 3b on the second holding table 13a is lowered via the second lifter 14a. The second holding table 13a is inclined in the direction of arrow I at its lowest position. In this manner, the heat exchanger unit 8 on the support fixture 13b slides sidewardly in the direction of arrow J onto the return conveyor 15. The heat exchanger unit 8 on the support fixture 3b is subsequently conveyed back towards the first holding table 13 of the supplying mechanism 12 via the return conveyor 15.

Then, the heat exchanger unit 8 is removed from the first holding table 13 for newly mounting the next heat exchanger unit 8 with the tubes to be expanded thereon, where the support fixture 3 remains on the holding table for receiving the heat exchanger unit via the tube-receiving member 3c. Thus, the tube expander of this arrangement enables an operator to readily and instantly mount or dismount the heat exchanger unit 8, consequently shortening the time necessary to supply, transfer and discharge the heat exchanger unit 8 around the tube expanding process, and automatically carrying out these steps without manual labor.

Referring to FIG. 5, the tube expander has an endless transporting mechanism 16 which extends annularly from the one end of the mounting table 3, passes through the tube expanding area long the longitudinal direction of the mounting table 3, then goes down vertically at the opposite end of the mounting table 3. The endless transporting mechanism 16 then turns towards the one end of the mounting table 3, goes upwardly at the one end of the mounting table 3 and is connected to the one end thereof so as to form an endless transporting means. The support fixtures 3b are disposed in the same pitch as the holding mechanism 4 and move via the endless transporting mechanism 16 in synchronism with the holding mechanism 4. The support fixtures 3b are annularly moved in a predetermined direction indicated by arrow A along a guide groove 3e defined on the mounting table 3 such that the mounting region 3d of each support fixture 3b can face the reciprocable slide plate 6.

In the mounting table 3 is provided a stopping mechanism (not shown) which enables the endless transporting mechanism 16 to stop during the period when the mandrels 6a are expanding the tubes and the clamping mechanisms 4 are moving back to the initial positions.

With the above arrangement, the heat exchanger unit 8 is continuously mounted on the support fixture 3b at the one end of the endless transporting mechanism 16 and is moved forward such that it is supplied into the tube expanding area and discharged therefrom.

Thus, the tube expander of this arrangement in which the support fixture 3b can be positively moved via the endless transporting mechanism 16, can more effectively omit the undesirable dropping of the tube from the radiation fin and the deformation of the partially assembled heat exchanger unit 8 which may occur particularly in the transporting process. In addition, as in the other embodiments, the tube expander of this arrangement enables the operator to readily and instantly mount or dismount the heat exchanger unit 8 at one end of the tube expander, and consequently shortening the time necessary to supply, transfer and discharge the heat exchanger unit 8 around the tube expanding process. Further, these troublesome steps may be automatically carried out with the above arrangement.

In the embodiments of FIGS. 4 and 5, the support fixture 3b is transported horizontally along the longitudinal direction of the mounting table 3 and is moved vertically at the opposite ends of the mounting table 3. However, it is a matter of course that the support fixture 3b may be transported horizontally throughout the line. In this regard, the support fixture 3b may turn horizontally at the opposite ends of the mounting table 3 so as to follow a horizontal annular trajectory.

Further, various constructions may be employed for the stopping mechanism provided that it can stop the endless transporting mechanism 16 in synchronism with the movements of the holding mechanism 4, the reciprocable slide plate 6 or the like. In addition, as can be seen, it is not essential of the present invention to provide the stopping mechanism in the tube expander.

This specification is by no means intended to restrict the present invention to the preferred embodiments set forth therein. Various modifications to the inventive tube expander with a means for transporting the heat exchanger unit in the tube expanding process, as described herein, may be made by those skilled in the art without departing from the spirit and scope of the present invention.

What is claimed is:

1. A tube expander comprising
a tube expander body,
a reciprocable member to be reciprocated with its surface facing a tube to be expanded which is mounted in a heat exchanger unit,
a mandrel mounted on said reciprocable member so as to move in a moving direction and be inserted into said tube for the expansion thereof,
a mounting table disposed towards the moving direction of said mandrel,
a support fixture, on which said heat exchanger unit is separably mounted, movably mounted on said mounting table such that said support fixture is transported on said mounting table in a longitudinal direction transverse relative to the moving direction of said reciprocable member, and
a holding means provided on at least one of said mounting table and a peripheral area thereof for holding at least one of said support fixture and said heat exchanger unit mounted thereon, for introducing said heat exchanger unit with said tube to be expanded into a tube expanding area, and for discharging said heat exchanger unit from said tube expanding area after expanding said tube.

2. The tube expander as set forth in claim 1, wherein said holding mechanism is disposed endlessly so as to successively transport said heat exchanger unit in a predetermined direction along the longitudinal direction of said mounting table, while holding at least one of said support fixture and said heat exchanger unit mounted on said support fixture.

3. The tube expander as set forth in claim 1, wherein said holding mechanism is disposed such that it can simultaneously hold a predetermined number of said heat exchanger units by at least one of said support fixture and said heat exchanger unit mounted thereon, move forward so as to transport said heat exchanger units by a predetermined distance, release them and move backward so as to hold further heat exchanger units.

4. The tube expander as set forth in any one of claims 1 to 3, wherein at least one of a mounting mechanism to mount said support fixture on said mounting table and a discharging mechanism to discharge said support fixture from said mounting table is disposed on at least one of said mounting table and said peripheral region thereof.

5. The tube expander as set forth in any one of claims 1 to 3, wherein a plurality of said support fixtures are successively and annularly transported such that a surface of each of said support fixtures adapted for mounting said heat exchanger unit can ordinally face said reciprocable member.

6. The tube expander as set forth in any one of claims 1 to 3, an endless transporting mechanism is provided on said mounting table so as to successively and endlessly transport a plurality of said support fixtures in a predetermined direction.

7. The tube expander as set forth in any one of claims 1 to 3, said support fixture is provided thereon with a tube-receiving member which is made of a resilient material.

8. The tube expander as set forth in claim 1, wherein said holding mechanism comprises a pair of clamping mechanism, each of which includes a clamping member which is pivotally movable so as to clamp at least one of said support fixture and said heat exchanger unit thereon in cooperation with the corresponding clamping member.

* * * * *